(12) United States Patent  
Pappas

(10) Patent No.: US 7,073,541 B2
(45) Date of Patent: Jul. 11, 2006

(54) CABLE/WIRE DRESSING TOOL

(76) Inventor: Lesley Pappas, 17030 N. 49th St. #2146, Scottsdale, AZ (US) 85254

( * ) Notice: Subject to any disclaimer, the term of this patent is extended or adjusted under 35 U.S.C. 154(b) by 222 days.

(21) Appl. No.: 10/794,002

(22) Filed: Mar. 4, 2004

(65) Prior Publication Data
US 2005/0194057 A1    Sep. 8, 2005

(51) Int. Cl.
B21F /00 (2006.01)
(52) U.S. Cl. .................... 140/123; 140/147
(58) Field of Classification Search ........... 140/123, 140/147; 29/755; 57/2.3, 1 UN; 254/134.3 CL; 174/68.3, 135
See application file for complete search history.

(56) References Cited

U.S. PATENT DOCUMENTS

| 3,699,692 | A |  | 10/1972 | Smith |  |
| 4,420,020 | A |  | 12/1983 | McGeary |  |
| 4,641,689 | A |  | 2/1987 | Christian |  |
| 4,766,668 | A |  | 8/1988 | Urness |  |
| 4,817,682 | A |  | 4/1989 | Williams |  |
| 5,074,021 | A |  | 12/1991 | Feng |  |
| 6,653,568 | B1 | * | 11/2003 | Davis | 174/68.3 |
| 6,766,833 | B1 | * | 7/2004 | Huang | 140/123 |
| 6,900,385 | B1 | * | 5/2005 | Hsu | 174/36 |
| 2002/0104577 | A1 |  | 8/2002 | McGroarty |  |
| 2005/0150565 | A1 | * | 7/2005 | Loeffler et al. | 140/123 |

* cited by examiner

Primary Examiner—Derris H. Banks
Assistant Examiner—Teresa M. Bonk
(74) Attorney, Agent, or Firm—LaValle D. Ptak

(57) ABSTRACT

A cable or wire dressing tool includes a main body in substantially the form of a doughnut-shaped member having a center hole and front and rear surfaces. The outer periphery of the doughnut-shaped member has spaced slots in it, with each of the slots sized to slidingly accommodate a single cable or wire. The center hole of the doughnut-shaped member is sized to accommodate a plurality of wires or cables passing therethrough.

16 Claims, 3 Drawing Sheets

CABLE/WIRE DRESSING TOOL

BACKGROUND

Voice cables and data cables typically extend from an entrance facility, equipment room or telecommunication closet which interfaces with outside telephone and data connections, from which the voice wires or cables and data wires or cables exit for distribution throughout the building serviced by the equipment room or telecommunications closet. Large numbers of wires or cables extend from a typical connecting equipment rack or back board and pass through some part of the telecommunications closet or other locations to a point where the individual cables are distributed to their terminating locations. When large numbers of wires or cables from one or more patch panels or termination blocks pass through the telecommunications closet, the appearance can be very messy. To improve the appearance of the telecommunications closet or any area where large numbers of wires or cables pass, many cable installers simply wrap the cables and squeeze them together into a tight bundle (or bundles), tying them with hook-and-loop straps or wire ties at a number of spaced intervals along the length of the bundle between entry of the wires or cables into the telecommunications closet and the patch panel or termination block into which the terminating installation is made. Such bundled cable runs typically vary in length from three feet to over 40 feet.

DETAILED DESCRIPTION

Figure 1:
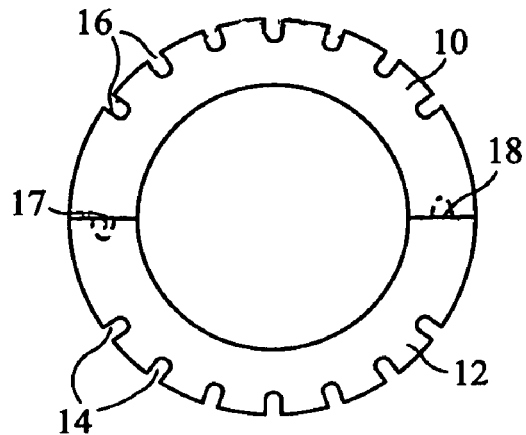
FIG. 1 is an end view of an embodiment of the invention.
Figure 3:
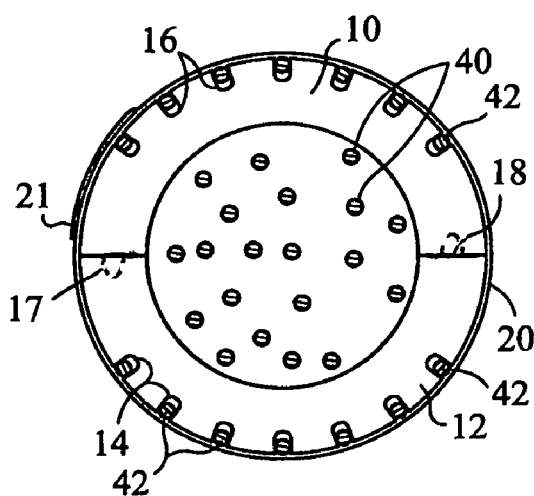
FIG. 3 is an end view of the-embodiment shown in FIGS. 1 and 2 illustrating the manner of its orientation with a plurality of cables.
Figure 2:
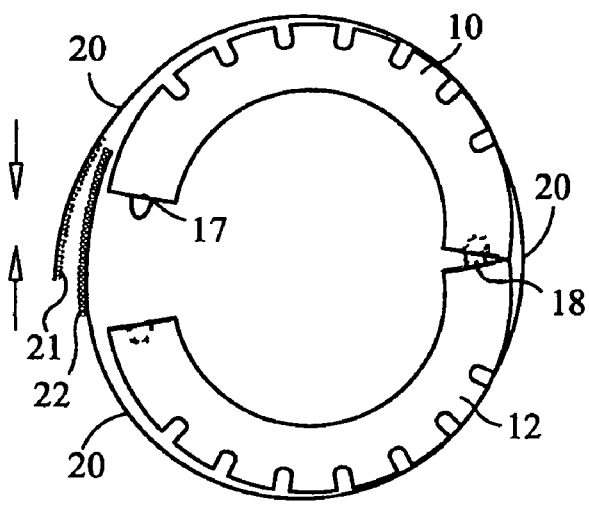
FIG. 2 is an end view of the embodiment shown in FIG. 1 illustrating additional features thereof.
Figure 4:
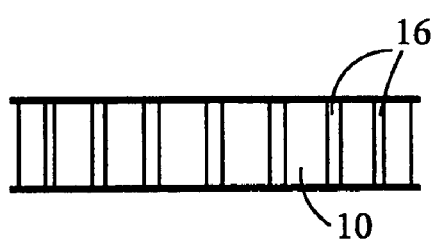
FIG. 4 is a top view of the embodiment shown in FIG. 1.

Reference now should be made to the drawings in which the same reference numbers are used throughout the different figures to designate the same or similar components. FIGS. 1, 2 and 3 are directed to an end view or side view of an embodiment of a cable dressing tool which is used to organize or align bundles of cables into neat-appearing cable bundles.

The tool basically comprises two parts 10 and 12, which are releasably interconnected together by suitable latches or fasteners 17 and 18, which may be of any number of conventional configurations. As is readily apparent from an examination of FIGS. 1, 2 and 3, the two parts 10 and 12, when they are interconnected as shown in FIGS. 1 and 3, form a tire-shaped or doughnut-shaped configuration. The center is an open circle having a diameter of approximately 1½", and the outer diameter of the tool is approximately 2½", with a thickness between the front and back surfaces of approximately 1". These are typical dimensions for use of the tool with typical voice cables and data cables of the type which include four different wire pairs (eight wires) in each cable. Obviously, the dimensions of the tool may be varied substantially from the specific dimensions given here, depending upon the particular application which is to be made of the tool and the relative dimensions of the various cables which are to be organized or dressed by it.

The tool typically is used in conjunction with dressing or organizing a large number of cables of the type described above coming from various locations in a building into an equipment room or telecommunications closet. The cables are connected into standard racks, cabinets or back boards which then in turn are connected into the outside line connections to the building.

Currently, patch panels used in the equipment room or telecommunications closet of many buildings is in a standard format for handling or terminating twenty-four cables. As a consequence, this is the number of cables which conveniently can be bundled together for each particular patch panel or termination block as the various cables are pulled from locations all over the building into the telecommunications closet for final connections. If no organization of the various cables is made in the telecommunications closet, the cables which extend from the cabinet to the telecommunications closet exits to the various locations in the building can result in a very large and messy appearing tangle of cables. Many IP technicians and telephone system managers for such buildings find this appearance to be unacceptable, and want the cables to be in neat bundles as they exit the wall into (or from) the telecommunications closet and then into the various patch panels or termination blocks where the final connections are made.

Although it is possible to simply wrap groups of cables (for example, the 24 cables destined for a particular cabinet) and squeeze them together in a wound bundle with plastic, wire or VELCRO® ties spaced at intervals along the length of cable bundle, such bundled cables still do not provide a completely neat appearance, since individual cables in the bundle tend to intertwine and different cables may be located on the inside and the outside of the bundle at different points along its length. In order to make the bundles neat, a great deal of time can be consumed in attempting to maintain some type of order or alignment in the various cables of the bundle.

In order to use the tool which is shown most clearly in FIGS. 1, 2 and 3, the two parts 10 and 12 first are either fully or partially separated from one another (with a partial separation shown in FIG. 2). The two parts then are placed into a bundle of cables located in the telecommunications closet between the termination location and the openings through which the cables extend into the telecommunications closet from other parts of the building. It is to be noted that the tool 10, 12 is placed into the bundle, and not over an end of it.

If, by way of example, a bundle of 24 cables is to be dressed and aligned by the tool, ten of those cables are laced or located within the inner circular hole of the tool, as illustrated in FIG. 3. Once this is done, the two parts 10 and 12 of the tool are closed together by engaging the fasteners 17 and 18, as shown in FIGS. 1 and 3, to cause the tool to encircle the innermost ten cables 40. The outer periphery of the two parts 10 and 12 includes open slots 16 and 14, respectively. Each of these slots is designed to have a dimension to freely allow a sliding passage of a selected one of cables 42 to be placed in them. If a set of 24 cables is to be dressed by the tool, the seven slots 16 in the tool half 10 accommodate seven of the cables 42 and the seven slots 14 in the tool half 12 accommodate another seven cables 42. Thus, fourteen cables 42 are located in the slots 14 and 16 on the outside of the tool; and the remaining ten cables 40 are located in the center hole or doughnut center of the tool.

After the cables 42 are laced in the slots 16, 16, a flexible band 20 made of any suitable material, such as canvas, nylon or flexible plastic, is used to encircle the outer periphery of the tool, as shown in FIG. 2. The ends 21 and 22 of the band are secured together by means of a suitable releasable fastener, such as the hook-and-loop fastener which is shown most clearly in FIGS. 2 and 5. This flexible band 20 forms a collar which ensures that the cables 42 located in the slots 14 and 16 on the outer periphery of the tool do not slip out of the slots and are maintained in the relative orientation which is dictated by their placement in the respective slots.

Figure 5:
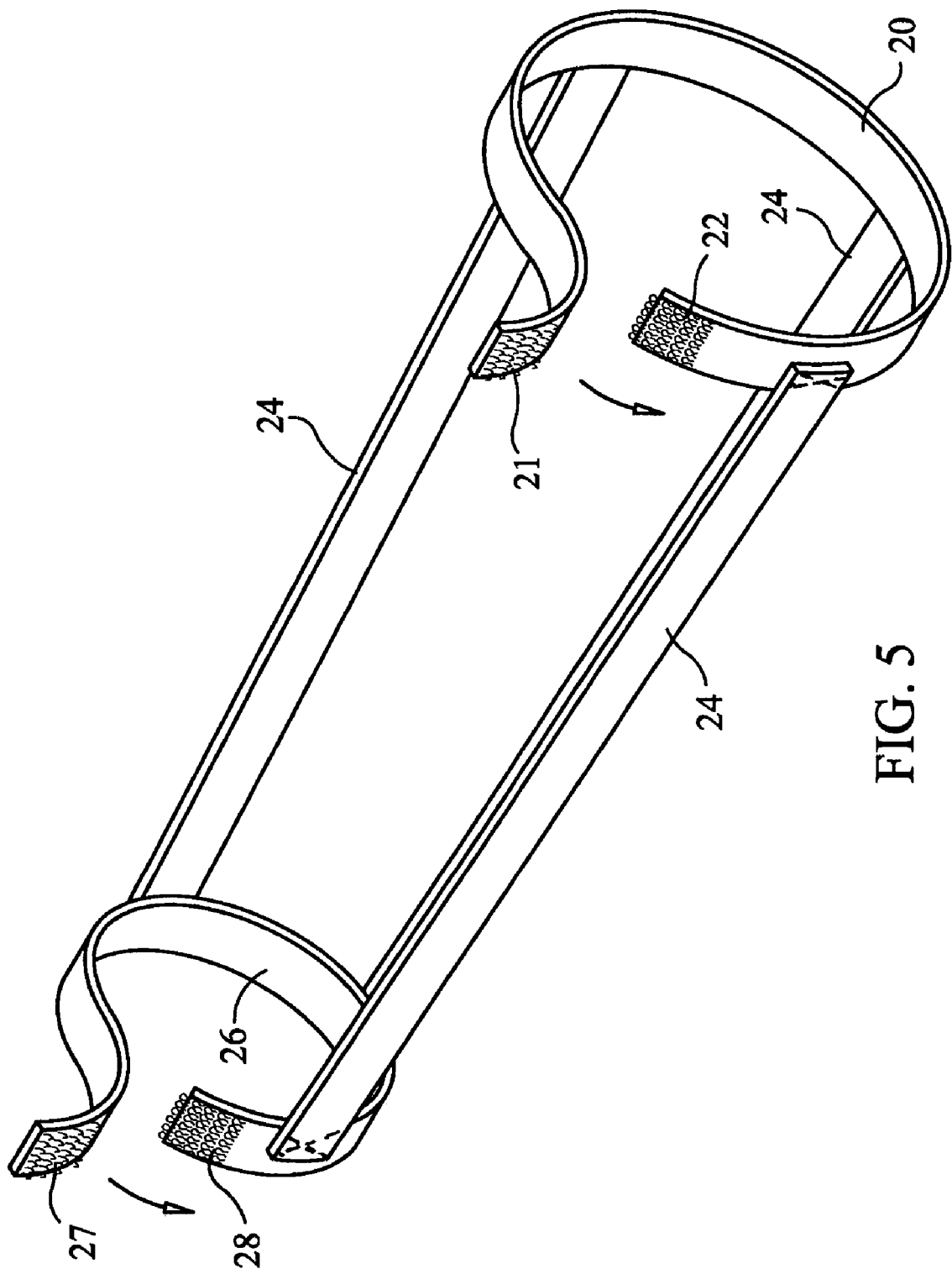
FIG. 5 is a perspective view of a portion of the embodiment shown in FIG. 2.
Figure 6:
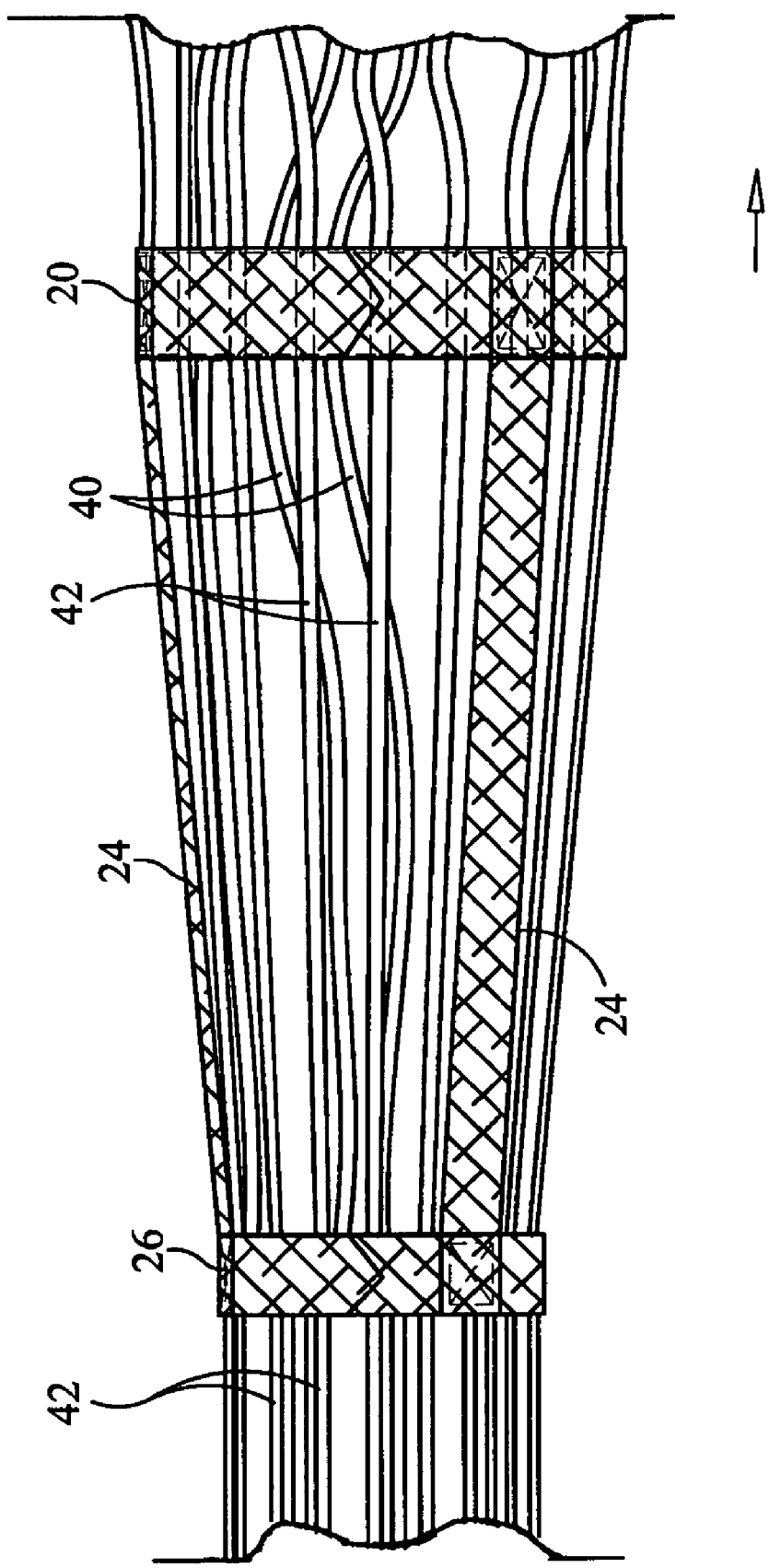
FIG. 6 is a side view illustrating the manner of use of the embodiment shown in FIGS. 1 through 5.

As shown in FIG. 5, the band or collar 20 has elongated straps 24 extending from it which are attached to a smaller band or collar 26. The band 26 has hook-and-loop fasteners 27 and 28 located on its ends. The band 26 is placed around the entire bundle of cables which are fed into it from the tool 10, 12, as illustrated in FIG. 6, and it is secured around the bundle. Consequently, as the tool is moved from left to right, as shown in FIG. 6, the cables 42 on the exterior are maintained aligned in the same relative orientation, as they are arranged in the slots 14, 16 as the tool is moved from left to right, as shown in FIG. 6, through cables. The smaller trailing band collar 26 then presents the dressed cable bundle in a neat and consistent pattern. The installer then periodically places a plastic, wire or hook-and-loop tie around the dressed cable bundle as it exits from the left-hand end of the band 26 at periodic intervals of a few inches apart as the tool 10, 12 is being drawn through the mass of cables toward the right.

The tool may be grasped by the fingers of the installer, in any of the areas on the periphery where the slots 14 or 16 do not appear. As shown most clearly in FIGS. 1, 2 and 3, this is primarily in the diametrically opposite sides adjacent the latches 17 and 18. For larger cable dressing applications where the tool itself is considerably larger than the one described above, separate handles could also be provided on the tool, if desired.

It should be noted that as the tool is drawn along, randomly aligned cables from left to right as shown in FIG. 6, the outer cables 42 are squeezed over the inner cables 40 in the inner core as the tool is moved through the tangle of cables 40 and 42 comprising the overall bundle. The tool functions much as a comb, aligning all of the outside cables 42 in straight lines over the inner ones 40 (the alignment of which is unimportant) to the left of the collar 26 (as viewed in FIG. 6) as the tool is drawn along or moved from left to right.

Once the entire length of the bundle of cables which is to be dressed is traversed by the tool, the tool is removed by first releasing the fasteners 21, 22 on the band 20 and 27, 28 on the band 26 to pull the bands 20 and 26 away from the cable bundle. The tool halves 10 and 12 then are separated by opening the latches 17, 18 and the outer cables 42 are disengaged from the slots 14 and 16. The tool then is withdrawn from the bundle.

The bundle of cables 40 and 42 may be unconnected at the final or terminating position of the tool; or the various cables 40 and 42 may be connected into a cabinet or some other terminating point. It does not matter, since it is not necessary ever to thread cable ends into any part of the tool. The tool itself is inserted into a cable bundle at any point along its length, as desired. This greatly facilitates the installation and use of the tool, and increases its versatility.

The foregoing description of embodiments of the invention is to be considered illustrative and not as limiting. For example, the tool may be made of any number of a variety of different materials, so long as those materials exhibit sufficient rigidity and strength to accomplish the function which has been described above for the tool. The particular number of slots 14, 16 and the relative sizes of the various components of the tool also may be varied in accordance with a particular use of the tool which is to be made. While a flexible band 20 and a flexible band 26 have been described in the foregoing description, these bands may be made of rigid material (hinged to open) and perform the functions which have been described above in conjunction with the flexible bands 20 and 26. Various other changes and modifications will occur to those skilled in the art for performing substantially the same function, in substantially the same way, to achieve substantially the same result, without departing from the true scope of the invention as defined in the appended claims.

What is claimed is:

1. A cable/wire dressing tool including a main body in substantially the form of a rigid doughnut-shaped member having a center hole and front and rear surfaces and having an outer periphery between the front and rear surfaces, the outer periphery of the doughnut-shaped member having spaced slots thereon, each sized to slidingly accommodate a single cable or wire therein, with the center hole of the member sized to accommodate a plurality of wires or cables passing therethrough.

2. A cable/wire dressing tool according to claim 1 wherein the doughnut-shaped member is made of two separable parts designed to open at least sufficiently to allow surrounding and placement of the plurality of wires or cables therein in the center hole thereof, whereupon the two parts of the doughnut shaped member are releasably closed together.

3. A tool according to claim 2 wherein the thickness between the front and rear surfaces is less than the diameter of the doughnut-shaped member.

4. A tool according to claim 1 wherein the thickness between the front and rear surfaces is less than the diameter of the doughnut-shaped member.

5. A cable/wire dressing tool including a main body in substantially the form of a doughnut-shaped member formed of two releasably interconnected semi-circular parts having a center hole and front and rear surfaces and having an outer periphery, the outer periphery of the doughnut-shaped member having spaced slots thereon, each sized to slidingly accommodate a single cable or wire therein, with the center hole of the member sized to accommodate a plurality of wires or cables passing therethrough.

6. The tool according to claim 5 further including a releasable band for encircling the outer periphery of the doughnut-shaped member to maintain wires or cables in the slots in the periphery thereof during use.

7. The tool according to claim 6 wherein the band is an elongated flexible belt having first and second ends releasably fastened together over the outer periphery of the doughnut-shaped member.

8. The tool according to claim 7 further including a second band designed to encircle a plurality of cables or wires after the tool is moved in one direction through a plurality of cables or wires with the second band coupled to and spaced from the first band a predetermined distance therefrom to maintain the cables or wires in a predetermined orientation defined by movement of the tool through the cables or wires.

9. The tool according to claim 5 further including a releasable band for encircling the outer periphery of the doughnut-shaped member to maintain wires or cables in the slots in the periphery thereof during use.

10. The tool according to claim 9 wherein the band is an elongated flexible belt having first and second ends releasably fastened together over the outer periphery of the doughnut-shaped member.

11. The tool according to claim 10 further including a second band designed to encircle a plurality of cables or wires after the tool is moved in one direction through a plurality of cables or wires with the second band coupled to and spaced from the first band a predetermined distance therefrom to maintain the cables or wires in a predetermined orientation defined by movement of the tool through the cables or wires.

12. A cable/wire dressing tool including a main body in substantially the form of a doughnut-shaped member having a center hole and front and rear surfaces and having an outer periphery, the outer periphery of the doughnut-shaped member having spaced slots thereon, each sized to slidingly accommodate a single cable or wire therein, with the center hole of the member sized to accommodate a plurality of wires or cables passing therethrough; and a releasable band for encircling the outer periphery of the doughnut-shaped member to maintain wires or cables in the slots in the periphery thereof during use.

13. The tool according to claim 12 wherein the band is an elongated flexible belt having first and second ends releasably fastened together over the outer periphery of the doughnut-shaped member.

14. The tool according to claim 12 further including a second band designed to encircle a plurality of cables or wires after the tool is moved in one direction through a plurality of cables or wires with the second band coupled to and spaced from the first band a predetermined distance therefrom to maintain the cables or wires in a predetermined orientation defined by movement of the tool through the cables or wires.

15. A method for dressing bundles of cables or wires including placing a doughnut-shaped tool around some of a plurality of cables or wires and placing others of the plurality of cables or wires in slots on the periphery of the tool, followed by moving the tool through the plurality of cables or wires to thereby align the cables or wires passing through the slots on the perimeter of the tool in a predetermined pattern around the cables or wires passing through the center of tool, followed by securing the bundle of cables or wires together after moving the tool through the plurality of cables or wires.

16. The method according to claim 15 wherein the tool is a doughnut-shaped ring with a hole in the center thereof and wherein placing the ring around some fo the plurality of cables or wires includes opening the ring to permit it to encircle some of the plurality of cables or wires in the hole therein followed by closing the ring.

* * * * *